(12) United States Patent
Akaiwa et al.

(10) Patent No.: US 7,518,959 B2
(45) Date of Patent: Apr. 14, 2009

(54) DISPLAY DEVICE AND DISPLAY METHOD

(75) Inventors: Masao Akaiwa, Nagano-ken (JP); Yuko Furukawa, Nagano-ken (JP); Norimitsu Baba, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 11/940,055

(22) Filed: Nov. 14, 2007

(65) Prior Publication Data

US 2008/0130421 A1 Jun. 5, 2008

(30) Foreign Application Priority Data

Dec. 1, 2006 (JP) .............................. 2006-325857
Dec. 1, 2006 (JP) .............................. 2006-325858

(51) Int. Cl.
*G04B 19/00* (2006.01)
(52) U.S. Cl. ........................ 368/82; 368/223; 368/239; 368/282
(58) Field of Classification Search ................. 368/223, 368/229, 89
See application file for complete search history.

(56) References Cited

U.S. PATENT DOCUMENTS

| | | | | |
|---|---|---|---|---|
| 4,130,987 | A * | 12/1978 | Schickedanz | 368/29 |
| 6,711,101 | B2 * | 3/2004 | Bornovski | 368/223 |
| 7,460,085 | B2 | 12/2008 | Ishii | |
| 2008/0002527 | A1 * | 1/2008 | Ishii et al. | 368/239 |
| 2008/0123473 | A1 * | 5/2008 | Ozawa et al. | 368/18 |

FOREIGN PATENT DOCUMENTS

| | | |
|---|---|---|
| CN | 1649474 A | 8/2005 |
| DE | 3810527 A1 | 10/1989 |
| DE | 19535885 | 4/1997 |
| GB | 442283 | 1/1935 |
| GB | 1359373 | 7/1974 |
| GB | 2202972 | 10/1988 |
| JP | 2006171412 | 6/2006 |
| WO | 0059327 | 10/2000 |

* cited by examiner

*Primary Examiner*—Vit W Miska
*Assistant Examiner*—Sean Kayes
(74) *Attorney, Agent, or Firm*—Mark P. Watson

(57) ABSTRACT

A display device has a timekeeping unit that keeps time; and a display unit that displays numerals denoting the hour value of time information, numerals denoting the tens digit of the minute value of the time information, and numerals denoting the ones digit of the minute value of the time information at dispersed over the display area of the display device, and varies the position where time information is displayed by the numeral denoting the hour value, the numeral denoting the tens digit of the minute value, and the numeral denoting the ones digit of the minute value, based on time information kept by the timekeeping unit. The numeral denoting the hour value, the numeral denoting the tens digit, and the numeral denoting the ones digit are displayed on the display unit according to at least one of a specified display state and a specified display position.

15 Claims, 14 Drawing Sheets

DISPLAY DEVICE AND DISPLAY METHOD

CROSS-REFERENCE TO RELATED APPLICATIONS

Japanese Patent application Nos. 2006-325857 and 2006-325858 are hereby incorporated by reference in their entirety.

BACKGROUND

1. Field of Invention

The present invention relates to a display device and to a display method.

2. Description of the Related Art

Ring-shaped timepieces that have a display panel disposed around the circumference of the timepiece are known from the literature. See, for example, Japanese Unexamined Patent Appl. Pub. JP-A-2006-171412 (FIG. 15).

Information is displayed on the display panel taught in JP-A-2006-171412 in the same way as a common conventional timepiece that has a display panel, and is therefore lacking in design appeal as a bracelet or a ring-shaped timepiece with high decorative potential. More specifically, while a large display panel is disposed around the circumference of the ring, the time is displayed in only a portion of the display, and even if the time is decoratively displayed in this portion, the display panel overall is lacking in decorative appeal. The display method therefore does not take advantage of the design potential afforded by the shape of the ring.

It is also easy for the part where the time is displayed on the display panel of this timepiece to be hidden from view because the display area of the display panel covers a wide area round the circumference and the ring (bracelet) rotates easily around the wrist when the timepiece is worn.

Improving the readability of displayed information and the product appearance is a problem common to display devices that include a timepiece. More particularly, because the attractiveness of a timepiece is a matter of personal preference, there is room for improvement in readability and appearance whether the display panel is shaped like a ring or a rectangular display panel is disposed to the surface of an external case member.

SUMMARY OF THE INVENTION

A display device and a display method for a timepiece according to the present invention enable greatly improving the readability of displayed information and the design appearance.

A display device according to a first aspect of the invention has a timekeeping unit that keeps time; and a display unit that displays numerals denoting the hour value of time information, numerals denoting the tens digit of the minute value of the time information, and numerals denoting the ones digit of the minute value of the time information at dispersed over the display area of the display device, and varies the position where time information is displayed by the numeral denoting the hour value, the numeral denoting the tens digit of the minute value, and the numeral denoting the ones digit of the minute value, based on time information kept by the timekeeping unit. The numeral denoting the hour value, the numeral denoting the tens digit, and the numeral denoting the ones digit are displayed on the display unit according to at least one of a specified display state and a specified display position.

A first aspect of a display method according to the present invention is a display method for displaying numerals denoting the hour value of time information, numerals denoting the tens digit of the minute value of the time information, and numerals denoting the ones digit of the minute value of the time information, including steps of: displaying the numerals denoting the hour value, the numerals denoting the tens digit, and the numerals denoting the ones digit at positions dispersed over the display area of a display device; varying the position where the time information is displayed by the numeral denoting the hour value, the numeral denoting the tens digit of the minute value, and the numeral denoting the ones digit of the minute value; and displaying the numeral denoting the hour value, the numeral denoting the tens digit, and the numeral denoting the ones digit according to at least one of a specified display state and a specified display position.

The display state as used herein refers to display attributes such as the size of the displayed numerals, the font of the numerals (such as Gothic or stylized text), the style of the numerals (such as italic or bold), the display color, the contrast (gradation of the display color), and the orientation of the numerals (vertical orientation and front/back reversal).

The display state can be defined differently according to the type of information, such as the numerals denoting the hour value, the numerals denoting the tens digit of the minute, and the numerals denoting the ones digit of the minute. The display state can also be determined so that within the same type of information, such as the hour value, specific information determined from the time and other information are displayed in different states.

The display position refers to a general part of the display area of the display unit, such as the left side, the right side, or the middle. The display state is determined according to the type of information, such as the hour value, the tens digit of the minute, and the ones digit of the minute.

A display device that is easy to read and easy to use can be achieved by means of the present invention because the type of information, such as the hour value, the tens digit of the minute, and the ones digit of the minute, and time information identified from chronological information, can be easily determined from the display state and display position of the numerals.

Furthermore, because the numerals can also be distributed around the display area of the display unit, that is, the entire display area can be used efficiently to display information, the design and appearance of the display device can be greatly improved.

The invention thus enables balancing readability and design while also greatly improving both the readability and design, and thus affords a display device as a decorative accessory with a display function.

In a display device according to another aspect of the invention, prescribed information sequentially determined based on the time information is displayed in a first display state as the display state of the numerals denoting the hour value, the numerals denoting the tens digit, or the numerals denoting the ones digit; and at least one of a before value and an after value, which are the values chronologically before and after the prescribed information, is displayed in the numerals denoting the hour value, the numerals denoting the tens digit, or the numerals denoting the ones digit in a second display state, which is a display state that is different from the first display state.

In a display method according to another aspect of the invention, prescribed information sequentially determined based on the time information is displayed in a first display state as the display state of the numerals denoting the hour value, the numerals denoting the tens digit, or the numerals denoting the ones digit; and at least one of a before value and an after value, which are the values chronologically before and after the prescribed information, is displayed in the numerals denoting the hour value, the numerals denoting the tens digit, or the numerals denoting the ones digit in a second display state, which is a display state that is different from the first display state.

These aspects of the invention display prescribed information determined from time-based information in a prescribed display state in the numerals denoting the hour value, the numerals denoting the tens digit, and the numerals denoting the ones digit, and display the values before or after the prescribed information in a different display state.

For example, if the hour of the current time is 8 and the prescribed information is therefore 8, "7" or "9" is displayed in a second display state that is different from the first display state used to display the "8." More specifically, because a series of time values (such as 1, 2, 3, 4, ... 12) are displayed at different positions in the display area and the value before or after the prescribed information is displayed in a state distinguishable from the prescribed information, the prescribed information can be predicted by viewing the before or after value without actually seeing the prescribed information. The time information can thus be easily determined, and a display method and a display device that is easy to read and easy to use can be achieved.

Furthermore, because the numerals for displaying time information can be distributed around the display area of the display unit, that is, the entire display area can be used efficiently to display information, the design and appearance of the display device can be greatly improved.

More specifically, even when different information is displayed in different parts of the display area, the invention makes finding the displayed information easy while also greatly improving both the readability and design, and thus affords a display device as a decorative accessory with a display function.

The types of chronological time information include the hour, the tens digit of the minute, the ones digit of the minute, calendar information such as the year, month, day, and weekday. Of these values, prescribed information and before and after values of the prescribed information can be displayed for one part of the time information, such as the hour, the tens digit of the minute, or the ones digit of the minute.

This arrangement enables displaying, for example, the ones digit of a value that is expressed using more than one digit, such as the minute, as the prescribed information displayed in a first display state while displaying the values before and after the current ones digit in a second display state.

These chronological information indicators can be disposed in a regular or irregular (random) arrangement.

Preferably, information that is not the prescribed information, the before value, or the after value is displayed in the numerals denoting the hour value, the numerals denoting the tens digit, and the numerals denoting the ones digit in a third display state, which is a display state different from the first and second display states.

This aspect of the invention displays other information in addition to the prescribed information and the before and after information. This increases the design elements and derives decorativeness from the entire display area. More specifically, the entire display unit becomes a single decorative screen, and the design and appearance can be further improved.

Yet further preferably, the difference between the first display state and the second display state is a difference in the contrast of the display colors presented on the display unit or a difference in the hue of the display colors presented on the display unit.

This aspect of the invention enables easily achieving first and second display states and a unified display using differences in the contrast or hue of the first and second display states.

If an electrophoretic display is used for the display unit, the electrophoretic display can be driven so that the contrast when the electrophoretic particles migrate to one substrate and when they migrate to the other substrate is high, and first and second display states with high contrast therebetween can be achieved. The display can thus be made even easier to read.

When differences in hue are used to render the first and second display states in an electrophoretic display, such as when two particles if different hue, such as white and blue, and different polarity are used, differences in the display color determined by the positions of the particles in the electrophoretic layer can be used to achieve the first and second display states.

The electrophoretic display can be rendered with an arrangement having a plurality of panels each having a pair of substrates with an intervening electrophoretic layer, in which case the contrast and hue are determined by the colors of the particles in the panels and the color of the liquid phase of the electrophoretic layer.

The third display state can also be achieved by differences identical to the differences between the first and second display states. These first, second, and third display states can be as contrast levels such as black, dark gray, and light gray.

Yet further preferably, the other of the before value and the after value is displayed in a display state other than the first display state and the second display state.

By displaying the before and after information using a display state different from the second display state and the other display states, whether the before and after information is the information before or the information after the prescribed information can be immediately determined from the display state of the before and after information, and ease of use is thus improved.

In a display device according to another aspect of the invention the numerals denoting the hour value, the numerals denoting the tens digit, and the numerals denoting the ones digit are displayed in display states prescribed for the hour value, the tens digit, and the ones digit, respectively.

In a display method according to another aspect of the invention the numerals denoting the hour value, the numerals denoting the tens digit, and the numerals denoting the ones digit are displayed in display states prescribed for the hour value, the tens digit, and the ones digit, respectively.

This aspect of the invention enables easily differentiating the type of information, such as the hour, tens digit of the minute, and ones digit of the minute, based on the display state, and thus affords an easy to read and easy to use display device.

Furthermore, because information is distributed around the display area of the display unit, that is, the entire display area can be used efficiently to display information, the design and appearance of the display device can be greatly improved.

More specifically, because readability and design can be balanced and readability and design can be greatly improved, the invention can be used to provide a display device as a decorative accessory with a display function.

In a display device according to another aspect of the invention the numerals denoting the hour value, the numerals denoting the tens digit, and the numerals denoting the ones digit are displayed in a size prescribed for the hour value, the tens digit, and the ones digit, respectively.

In a display method according to another aspect of the invention the numerals denoting the hour value, the numerals denoting the tens digit, and the numerals denoting the ones digit are displayed in a size prescribed for the hour value, the tens digit, and the ones digit, respectively.

This aspect of the invention enables easily differentiating the type of information, such as the hour, tens digit of the minute, and ones digit of the minute, based on the display size, and thus affords an easy to read and easy to use display device and a display method.

Furthermore, because numerals, letters, symbols, pictures, and other display elements are distributed around the display area of the display unit, that is, the entire display area can be used efficiently to display information, the design and appearance of the display device can be greatly improved.

More specifically, because the types of displayed information can be easily distinguished, and readability and design can be greatly improved, the invention can be used to provide a display device as a decorative accessory with a display function.

The information can also be disposed in a regular or irregular (random) arrangement in the display area of the display unit.

For example, a "1" denoting the hour, a "1" denoting the tens digit of the minute, and a "1" denoting the ones digit of the minute can be displayed in the same font but different font sizes, and the information displayed (the hour, tens digit, or ones digit) can be easily differentiated based on the size of the numerals.

When the displayed information includes a series of numbers denoting the hour and minute, and the hour and minute can be difficult to differentiate, the effect of the invention rendering the information easily differentiable is particularly great.

In another aspect of the invention the numerals denoting the hour value, the numerals denoting the tens digit, or the numerals denoting the ones digit are disposed so that a part of the numerals extends outside the display area of the display unit and the numerals can be read.

By displaying numerals so that they appear to extend outside the display area, this aspect of the invention frees more display area in the display unit and enables displaying more information in this freed display area. More specifically, by displaying numerals so that they appear to extend outside the display area, this aspect of the invention increases the space efficiency in the display area of the display unit, and enables easily arranging more information efficiently within the display area.

Furthermore, by using a display method in which a portion of some information is displayed outside the display area, the size of these numerals can be increased, the readability of the numerals can be improved, an appearance that is novel compared with directly displaying all of the information can be achieved by rending part of the information outside the display area, and the design can also be improved.

Furthermore, because the type of displayed information, such as the hour, the tens digit, or the ones digit of the minute, can be determined based on the portion outside the display area, this effect can be combined with the differences in display size to make identifying the type of information even easier and further improve the readability of the information.

In a display device according to another aspect of the invention the numerals denoting the hour value, the numerals denoting the tens digit, and the numerals denoting the ones digit are displayed in a display position prescribed for the hour value, the tens digit, and the ones digit, respectively.

In a display method according to another aspect of the invention the numerals denoting the hour value, the numerals denoting the tens digit, and the numerals denoting the ones digit are displayed in a display position prescribed for the hour value, the tens digit, and the ones digit, respectively.

This aspect of the invention enables easily differentiating the type of information, such as the hour, tens digit of the minute, and ones digit of the minute, based on differences in the display position of the displayed numerals on the display unit, and thus affords an easy to read and easy to use display device and a display method.

Furthermore, because the numerals are distributed around the display area of the display unit, that is, the entire display area can be used efficiently to display information, the design and appearance of the display device can be greatly improved.

More specifically, because readability and design can be balanced and readability and design can be greatly improved, the invention can be used to provide a display device as a decorative accessory with a display function.

The information can also be disposed in a regular or irregular (random) arrangement in the display area of the display unit.

In a display device according to another aspect of the invention the numerals denoting the hour value, the numerals denoting the tens digit, and the numerals denoting the ones digit are disposed so that the hour value, the tens digit, and the ones digit are disposed regularly substantially along a prescribed axis of the display unit.

By using a regular, ordered arrangement, this aspect of the invention makes the information easy to read and enables easily differentiating the information based on the display position.

Yet further preferably, the display unit is an electrophoretic display device.

This aspect of the invention uses an electrophoretic display that uses fine electrophoretic particles to achieve a high resolution display and displays information so that the information can be easily identified, and thus improves the readability of the information.

An electrophoretic display changes the display state of the display surface by applying a voltage between a pair of substrates to cause electrophoretic particles to migrate. When voltage is not applied the electrophoretic particles remain in position and do not move, and the display state of the particles is retained. When the same display state is held for a long time, a so-called refresh process that applies a voltage to return the particles to the appropriate position can be applied at an appropriate time interval, but power consumption can generally be reduced because an electrophoretic display features high image retention when the display is not changed.

The electrophoretic display can be driven by a dot matrix method or a segment method. This invention arranges the numerals and other symbols denoting the information dispersed on the display unit, and thus enables a freedom of expression that is not possible using a conventional seven-segment display that expresses a single numeral with seven or thirteen segments.

When a segment drive method is used the electrodes (electrodes formed on the substrate) can be formed in the shapes of the numerals or other symbols denoting the information.

The font, size, orientation (vertical and mirror image, for example) and other aspects of the numerals and symbols denoting the information can be freely designed. The font or size can also be varied over a plurality of numerals. Furthermore, a plurality of numbers denoting the same time value, such as the number "1" denoting the hour of 1, can be disposed at plural positions on the display unit, and a different font, size, or other attribute can be used for each of the same values.

Yet further preferably, the display device has an annular case, and the display unit is disposed to the case curving around the circumference of the case.

This aspect of the invention enables rendering the display unit over a wide area around the entire circumference of the case. A display device with a large display area can thus be achieved, and a bracelet-style display device that enables inserting the wrist through the circle of the case can be achieved.

The entire area of the display unit that is a large screen disposed around the circumference of an annular case can thus be used to display information. That is, the annular case and rendering of the display unit substantially in a ring can be used to further improve the artistic design in a display unit with a large display area. Decorativeness can thus be imparted by the entire surface of the display unit, and the artistic design of the display unit does not stop at the design of the display unit itself, but can be made to extend to the overall design of the display device that has an annular case and is rendered substantially in a ring.

This annular case is not limited to the shape of a continuous circle, and can be C-shaped, for example. The shape of the substantially annular case includes circles, ovals, and polygons.

This electrophoretic display can impart flexibility to the display unit by using flexible circuit boards, and is thus a desirable arrangement for the invention.

When the display device is rendered with a substantially annular case, the position of the front of the display is not necessarily defined, and the numerals, letters, and other symbols can be freely arranged on the display unit. However, because the prescribed information and before and after information is displayed using first and second display states as described above, the displayed information can be easily found and the displayed information is not lost even if the case rotates around the wrist. More specifically, the readability of the information can be improved.

In the display device according to another aspect of the invention indications denoting chronologically identical information are disposed to the display unit at different locations.

This aspect of the invention displays prescribed information and the preceding and following information at plural places on the display, and thereby improves readability on the curved display member from multiple directions.

[Effect of the Invention]

The invention greatly improves the readability of displayed information as well as the appearance and design.

Other objects and attainments together with a fuller understanding of the invention will become apparent and appreciated by referring to the following description and claims taken in conjunction with the accompanying drawings.

DESCRIPTION OF THE PREFERRED EMBODIMENTS

Figure 1:
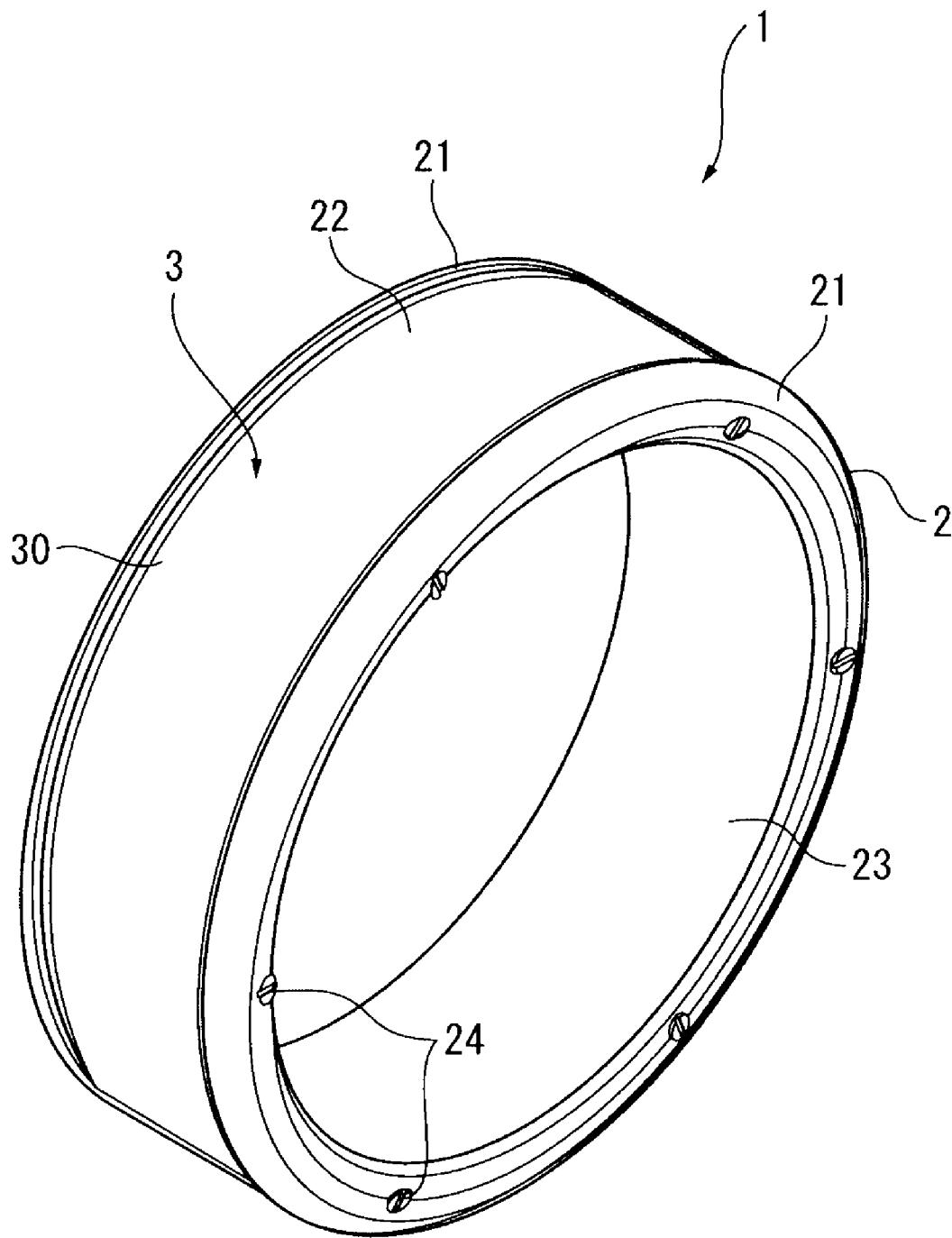
FIG. 1 shows the external appearance of a first embodiment of the invention.

Preferred embodiments of the present invention are described below with reference to the accompanying figures.

Note that the second and subsequent embodiments are described using the same reference numerals to refer to like parts in the first embodiment, and further description of those same parts is omitted or abbreviated.

Embodiment 1

A first embodiment of the invention is described next with reference to FIG. 1 to FIG. 10.

1. General Configuration

FIG. 1 is an oblique view of an electronic timepiece 1 as an example of a display device according to the present invention. This electronic timepiece 1 is rendered as a bracelet-type watch that has a display panel 30 disposed around the outside surface of an annular case 2 and is worn around the wrist, for example.

Figure 3:
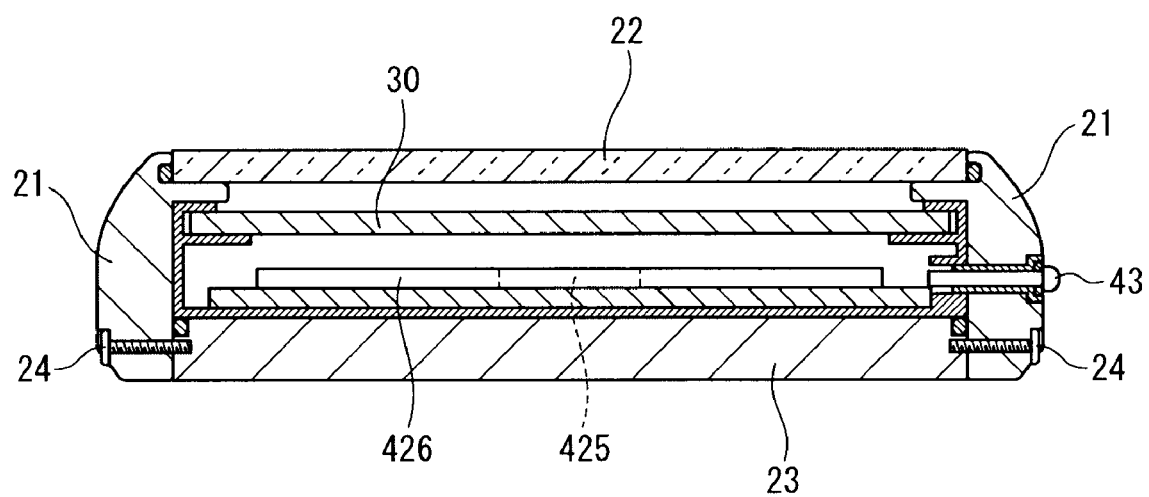
FIG. 3 is a section view through line III in FIG. 2.

The electronic timepiece 1 has a ring-shaped (annular) case 2 and a display module 3 that has a display panel 30, which in this embodiment of the invention is an electrophoretic display. As shown in FIG. 3, the case 2 is basically bobbin-shaped with a protruding side member 21 projecting to the outside in the radial direction of the case 2 at both sides edges of the case 2, and the display module 3 is assembled between these side members 21.

The case 2 also has a crystal 22 covering the case 2, and a back cover 23 disposed to the inside circumference of the case 2. The back cover 23 is fastened by screws 24 to the side members 21.

2. Display Module Configuration

The display module 3 includes the display panel 30 and a drive circuit unit 40 that drives the display panel 30 and has a timekeeping unit.

Figure 4:
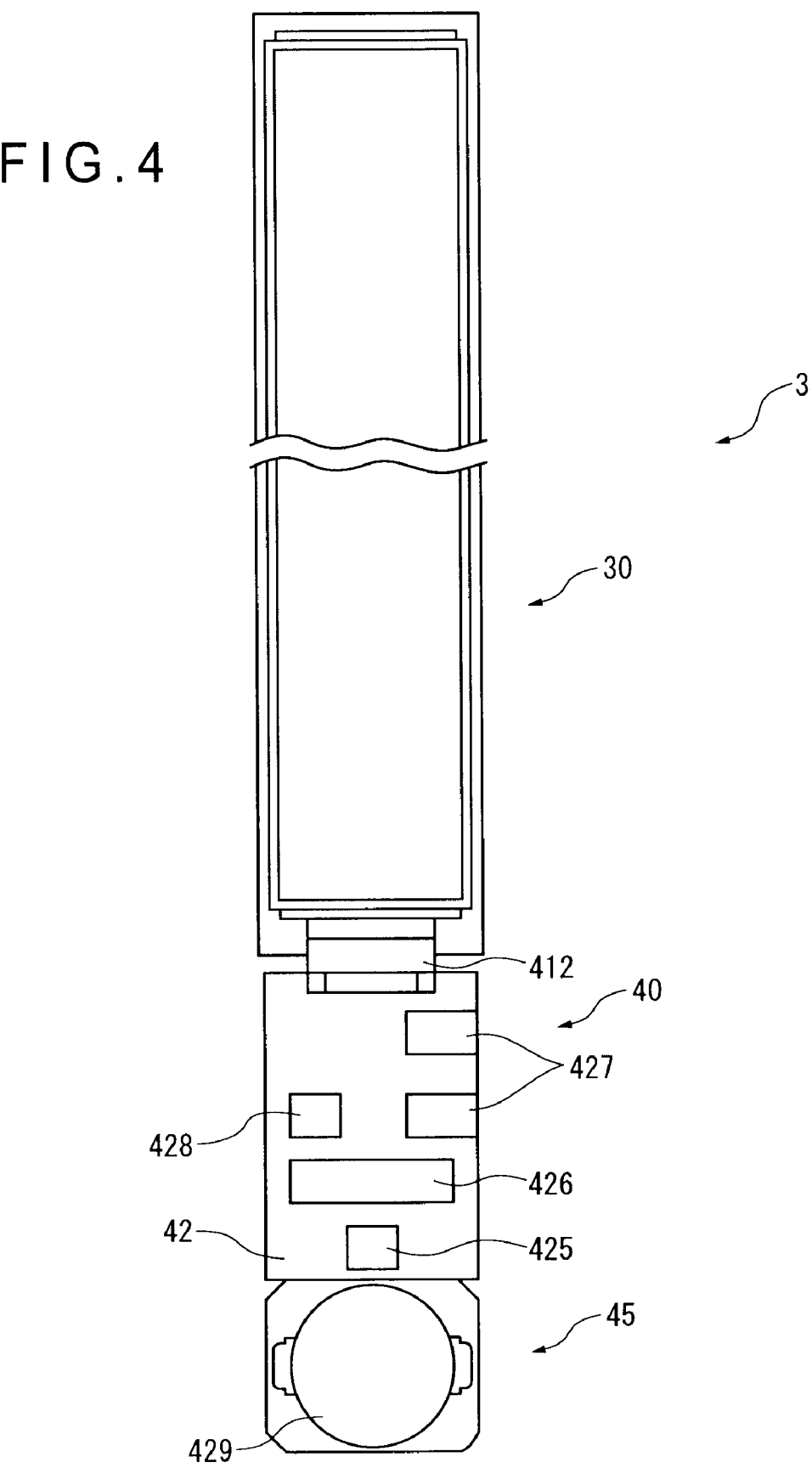
FIG. 4 is a plan view of the display panel and circuit board in a preferred embodiment of the invention.
Figure 5:
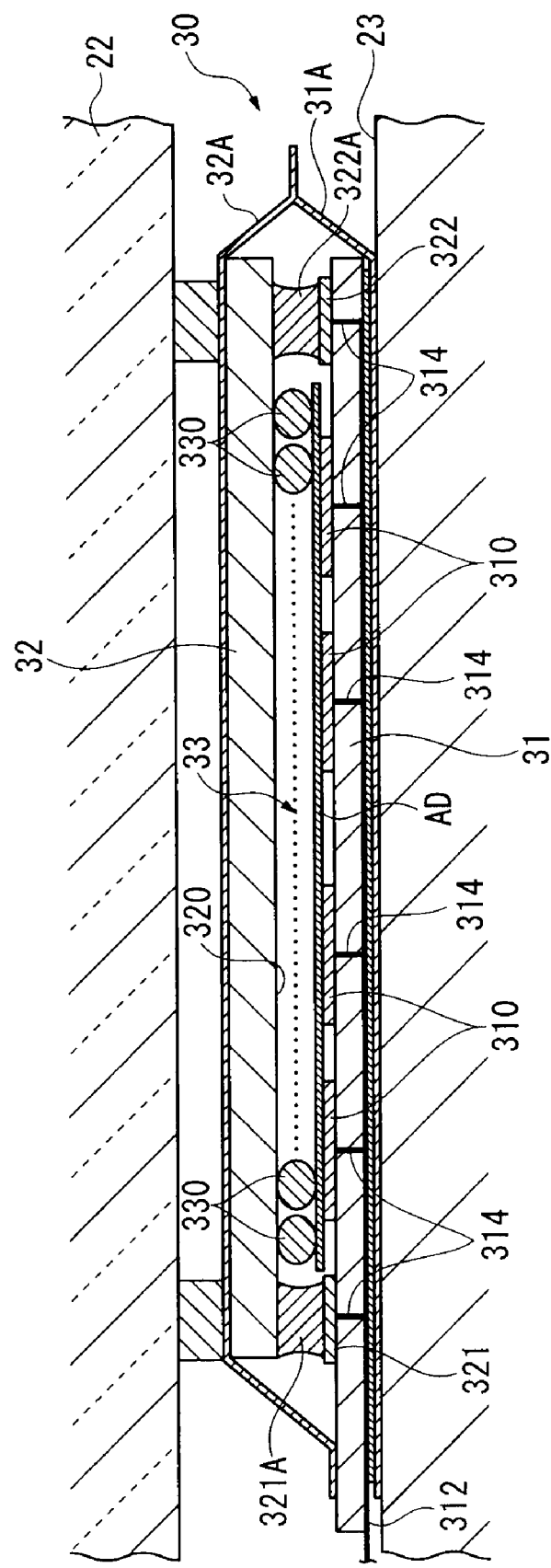
FIG. 5 is a section view of the display panel in a preferred embodiment of the invention.

FIG. 4 is a plan view of the display panel 30 and the drive circuit unit 40 of the display module 3, and FIG. 5 is a section view of the display panel 30. Note that for ease of understanding the electrophoretic display is shown flat (that is, not curved) in FIG. 5.

As shown in FIG. 4, the circuit board 42 and the display panel 30 are manufactured separately, and are connected by a wiring member 412 such as an anistropic conductive film (ACF).

3. Drive Circuit Unit Configuration

The circuit board 42 is a flexible circuit board made of polyimide, polyester, or other flexible plastic. Mounted on the circuit board 42 are a power supply 429, a controller 425 for controlling the electronic timepiece 1, a display drive circuit 426, a touch sensor 427, and a crystal oscillator circuit 428 rendering the timekeeping unit. The 429 is a lithium polymer battery or other flexible battery that supplies power to the other parts of the electronic timepiece 1, and the display drive circuit 426 is a driver chip for controlling the display operation of the display panel 30. Operating buttons 43 are disposed to the case 2 for actuating each of the touch sensors 427.

Though not shown in detail in the figures, the display drive circuit 426 and wiring member 412 are connected to each other.

4. Display Panel Configuration

The display panel 30 is disposed around substantially the entire outside circumference of the case 2, and as shown in FIG. 5 includes a display substrate 31, a transparent substrate 32, and an electrophoretic layer 33 disposed between the display substrate 31 and the transparent substrate 32. The time information displayed on the display panel 30 is seen through the transparent substrate 32 disposed on the outside surface side. The transparent substrate 32 and the display substrate 31 are made from polyimide, polyester, or other flexible resin.

Figure 2:
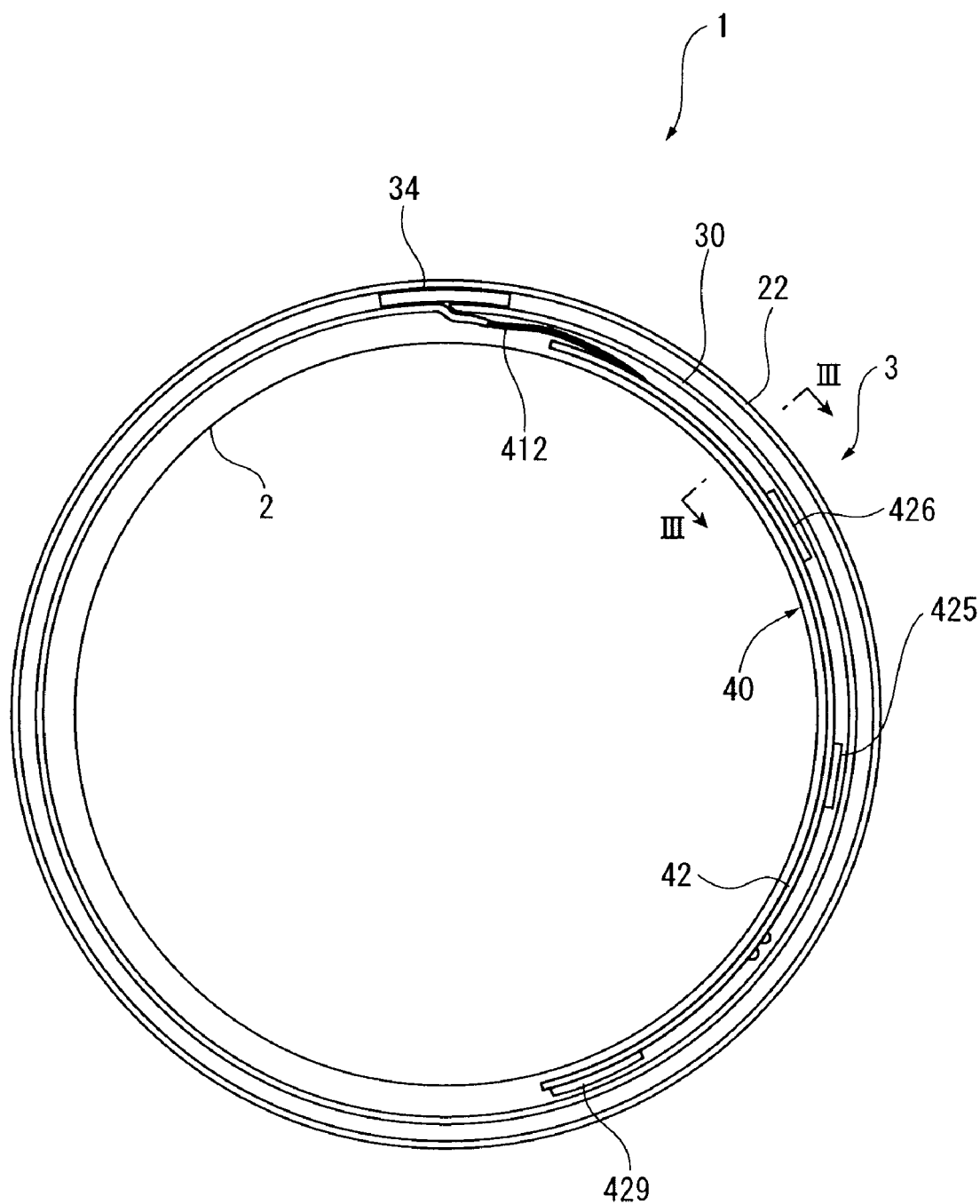
FIG. 2 is a side section view of a timepiece according to a preferred embodiment of the invention.

As shown in FIG. 2, the display panel 30 is curved substantially 360 degrees with the opposite ends connected to form a ring. An outside member 34 hides the end connection as shown in FIG. 2.

A segment electrode 310 is disposed to the surface of the display substrate 31 (the surface opposite the transparent substrate 32), and electrodes 321, 322 that are conductive to electrodes on the transparent substrate 32 side are disposed to the lengthwise edge parts of the display substrate 31.

A plurality of microcapsules 330 are bonded by applying an adhesive (adhesive layer) AD to the surface of the segment electrode 310, and these microcapsules 330 form the electrophoretic layer 33.

Wiring 312 formed on the back side of the display substrate 31 connects the segment electrode 310 and the electrodes 321, 322 formed on the front of the display substrate 31 to the circuit board 42 through the intervening wiring member 412 (FIG. 4). The wiring 312 is connected to the electrodes by means of vias 314 passing through the thickness of the display substrate 31.

A transparent common electrode 320 made of ITO (indium tin oxide), for example, is disposed to the back side of the transparent substrate 32 (the surface facing the display substrate 31). This common electrode 320 covers substantially the entire back side of the transparent substrate 32, and is the electrode common to each of the segment electrodes 310 for applying a voltage to each of the segment electrodes 310. A conductive member 321A, 322A is disposed between the common electrode 320 and the electrodes 321, 322, respectively.

The transparent substrate 32, the microcapsules 330, and the display substrate 31 are sealed by a moisture resistant sheet 32A disposed to the front surface of the transparent substrate 32 and a moisture resistant sheet 31A disposed to the back side of the display substrate 31.

5. Displaying by Means of Electrophoresis

Figure 6:
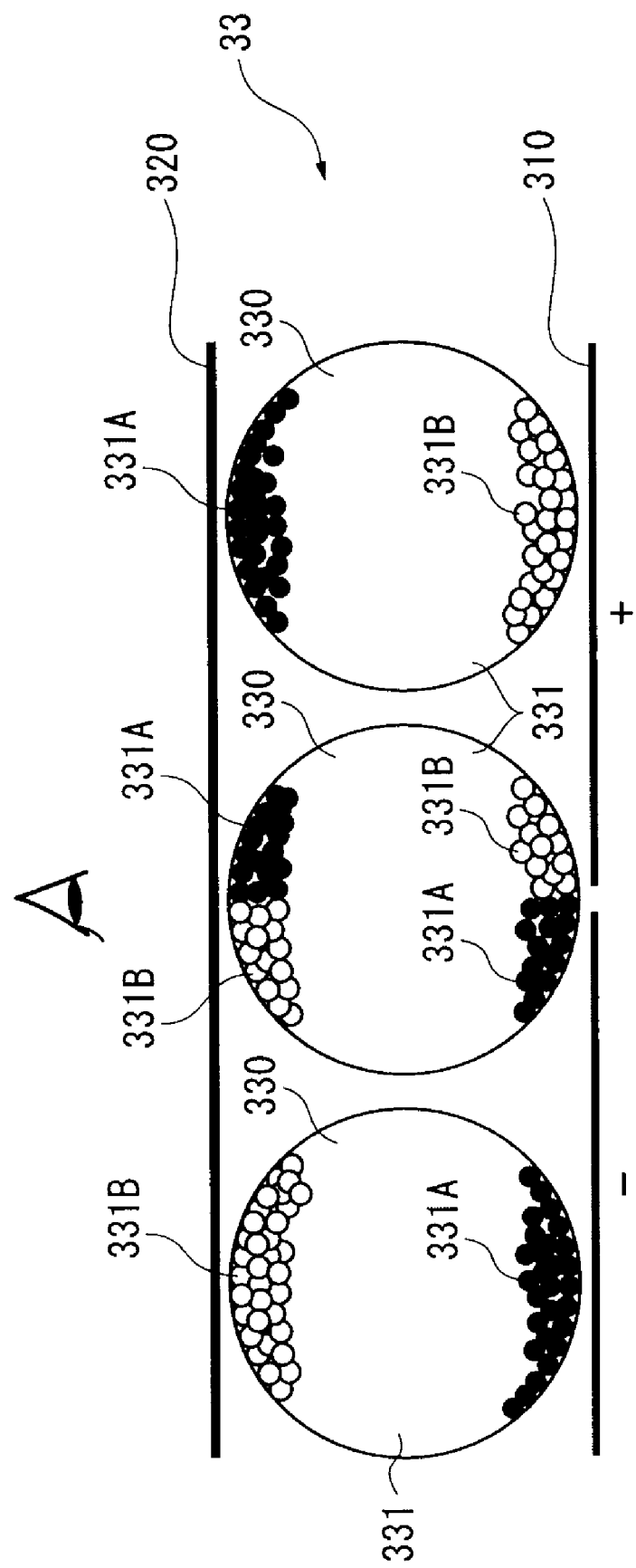
FIG. 6 is a schematic view describing the electrophoretic layer of the display panel.

FIG. 6 is a schematic diagram showing the electrophoretic layer 33 of the display panel 30. The electrophoretic layer 33 is formed by a high density array of numerous microcapsules 330, each microcapsule 330 containing an electrophoretic dispersion 331 of numerous suspended charged particles. The electrophoretic dispersion 331 renders an electrophoretic layer containing fluid particles of two different colors, specifically black electrophoretic particles ("black particles" below) 331A and white electrophoretic particles ("white particles" below) 331B. The black particles 331A and the white particles 331B are oppositely charged, and in this embodiment of the invention the black particles 331A are positively charged and the white particles 331B are negatively charged.

More specifically, when the segment electrode 310 is driven to a low potential level (LOW) and the common electrode 320 is driven to a high potential level (HIGH), the potential difference produces a field flowing from the common electrode 320 to the segment electrode 310, and causes the positively charged black particles 331A to migrate toward the segment electrode 310 and the negatively charged white particles 331B to migrate toward the common electrode 320. The display therefore presents white.

When the display is reversed from this white display so that the segment electrode 310 goes HIGH and the common electrode 320 goes LOW, the field reverses and the display panel 30 changes to black. In the example shown in FIG. 7 the segments rendering the numbers and letters are displayed using black.

Grays between black and white can also be displayed by adjusting the applied voltage and how long the voltage is applied to control how far the black particles 331A and the white particles 331B migrate.

Migration of the black particles 331A and the white particles 331B stops when the field stops, and the displayed color is retained.

The segment electrode 310 can be driven to display at least four gradations in this embodiment of the invention, specifically black, dark gray, light gray, and white, and differences in the contrast between these black, dark gray, light gray, and white levels enable the display to present four different gradations.

6. Display Panel Segment Electrodes

Figure 7:
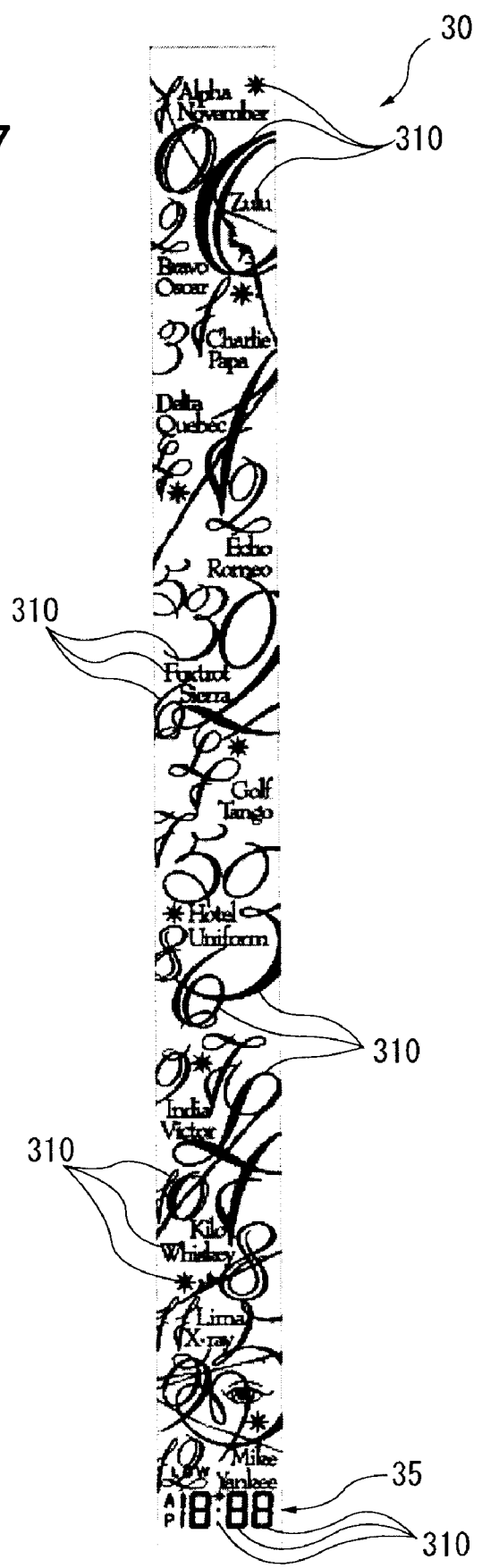
FIG. 7 is a plan view of the display panel in a preferred embodiment of the invention.

FIG. 7 is a plan view of the display panel 30. As shown in FIG. 7 different numerals, letters, and symbols are arranged dispersed over substantially the entire area of the display panel 30. A segment electrode 310 formed in the shape of a specific letter, numeral, or symbol is rendered for each individual letter, numeral, or symbol. The segment electrodes 310 are assigned to plural different types of display elements, but are collectively referred to herein as the segment electrodes 310 unless distinguishing the particular type of display element is necessary.

FIG. 7 shows the areas corresponding to substantially all of the segment electrodes 310 displayed as black on the display panel 30.

A seven-segment display unit 35 that uses seven segments per digit is disposed at one lengthwise end of the display panel 30. The colon and each of the seven segments per digit in this seven-segment display unit 35 are rendered by a segment electrode 310.

This display panel 30 has two drive electrodes not shown in the figures in order to also drive a background display unit, which is the part of the rectangular display area of the display panel 30 other than the segment electrodes 310 and the seven-segment display unit 35.

7. Display Elements of the Display Panel

FIG. 8 and FIG. 9 show the content displayed by the segment electrodes 310 disposed to the display panel 30 grouped by type. As in FIG. 7, FIG. 8 and FIG. 9 also show the areas of the display panel 30 corresponding to the segment electrodes 310 when displayed using black.

Figure 8A:
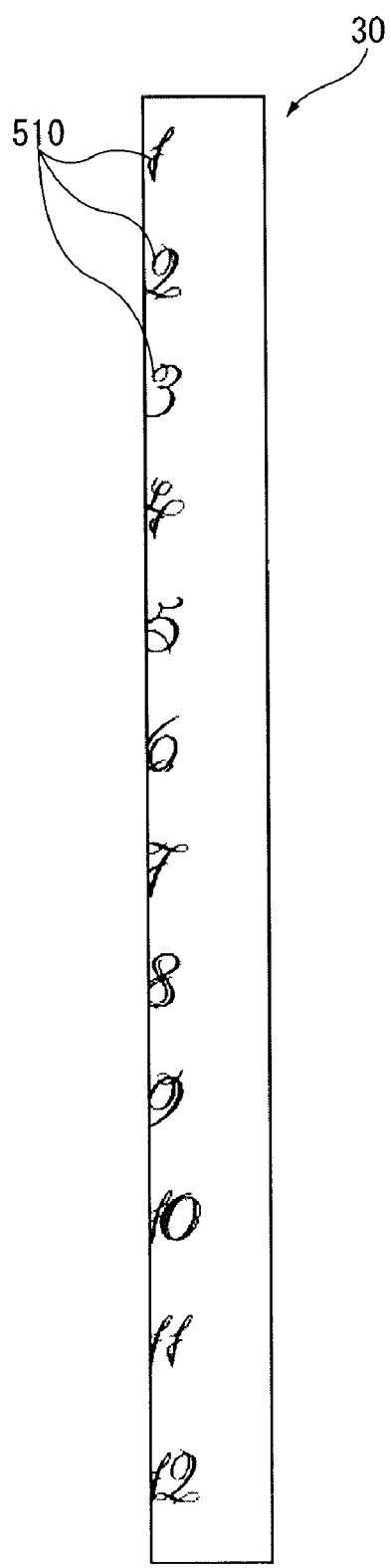
FIG. 8A shows the hour display of the display panel in a preferred embodiment of the invention.

FIG. 8A shows the series of twelve hour display segments 510 that are used to display the hour column of the time. The hour display segments 510 are disposed at a regular interval along one long side of the display panel 30.

Figure 8B:
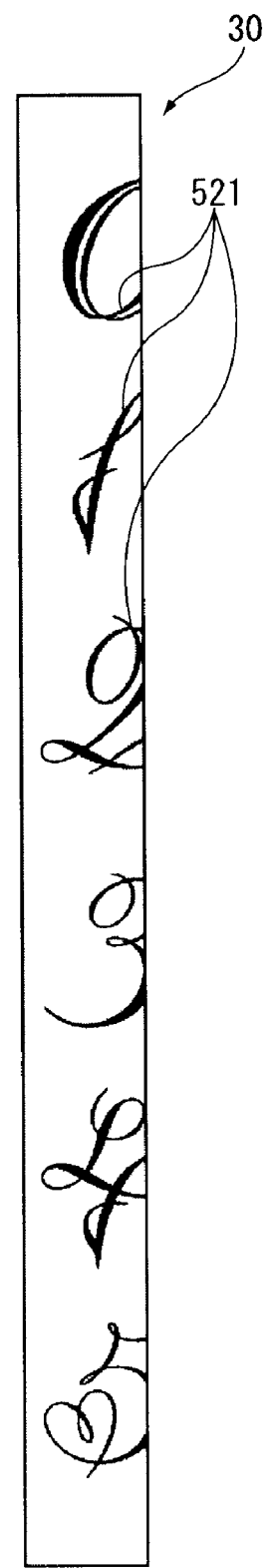
FIG. 8B shows the tens digit of the minute display on the display panel in a preferred embodiment of the invention.

FIG. 8B shows the series of six tens-digit display segments 521 for displaying the tens digit of the minute portion of the time. The tens-digit display segments 521 are disposed at a regular interval along one long side of the display panel 30 on the opposite side as the hour display segments 510.

Figure 8C:
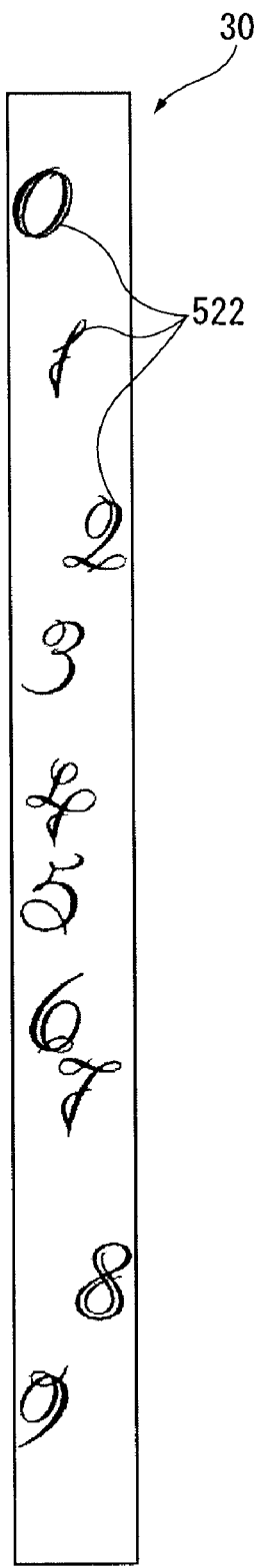
FIG. 8C shows the ones digit of the minute display on the display panel in a preferred embodiment of the invention.

FIG. 8C shows the series of ten ones-digit display segments 522 for displaying the ones digit of the minute portion of the time. The ones-digit display segments 522 are disposed in the center of the width of the display panel 30 between the hour display segments 510 and the tens-digit display segments 521.

The hour display segments 510, the tens-digit display segments 521, and the ones-digit display segments 522 can be easily distinguished based on differences in the display positions of the hour display segments 510, the tens-digit display segments 521, and the ones-digit display segments 522 on the display panel 30.

The hour display segments 510, the tens-digit display segments 521, and the ones-digit display segments 522 in FIG. 8A to FIG. 8C are all expressed as numerals of different font sizes. In this embodiment of the invention the font size of the tens-digit display segments 521 is largest, followed by the ones-digit display segments 522 and the hour display segments 510, thereby enabling easily distinguishing the tens-digit display segments 521, the ones-digit display segments 522, and the hour display segments 510 based on differences in font size (differences in display state) in addition to differences in their display positions.

The hour display segments 510 and the tens-digit display segments 521 are also positioned so that a portion of each numeral appears to extend outside the display area of the display panel 30 to the extent that the displayed digit can be read. More particularly, a portion of the left side of each of the numbers in the hour display segments 510 appears to extend to the outside, and approximately 10% to 30% of the width of the numbers in the tens-digit display segments 521 appears to extend to the outside on the right side of the display panel 30.

The ones-digit display segments 522 are arranged along the length of the display panel 30 between the hour display segments 510 and the tens-digit display segments 521 disposed along the long sides of the display panel 30 with the ones-digit display segments 522 staggered across the width of the display panel 30.

Because the hour display segments 510 and the tens-digit display segments 521 are at regular intervals, the ones-digit display segments 522 can be easily distinguished from the hour display segments 510 and the tens-digit display segments 521 based on this staggered layout.

The display panel 30 also has places where the hour display segments 510, the tens-digit display segments 521, and the ones-digit display segments 522 overlap.

Figure 9A:
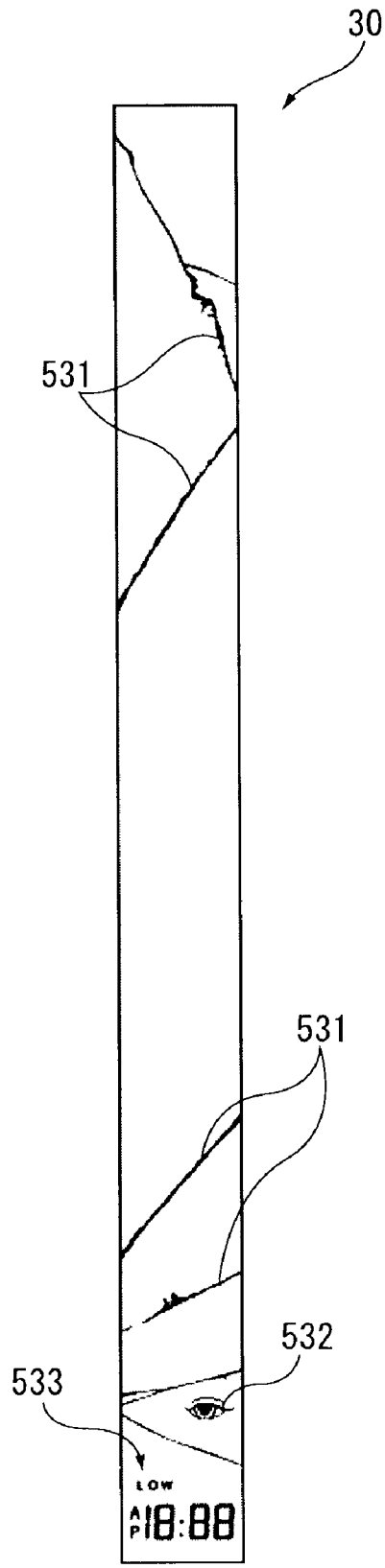
FIG. 9A shows an example of decorative content presented on the display panel in a preferred embodiment of the invention.

FIG. 9A shows crack indicators 531 for expressing a crack in the panel as a graphical image, a sleep indicator 532 represented by an eye, and a low battery indicator 533.

The crack indicators 531 are a decorative display that is presented at the start of an animated display that executes regularly, such as every hour. The sleep indicator 532 is displayed during an energy conservation mode that operates at a lower power consumption level than the normal mode.

Figure 9B:
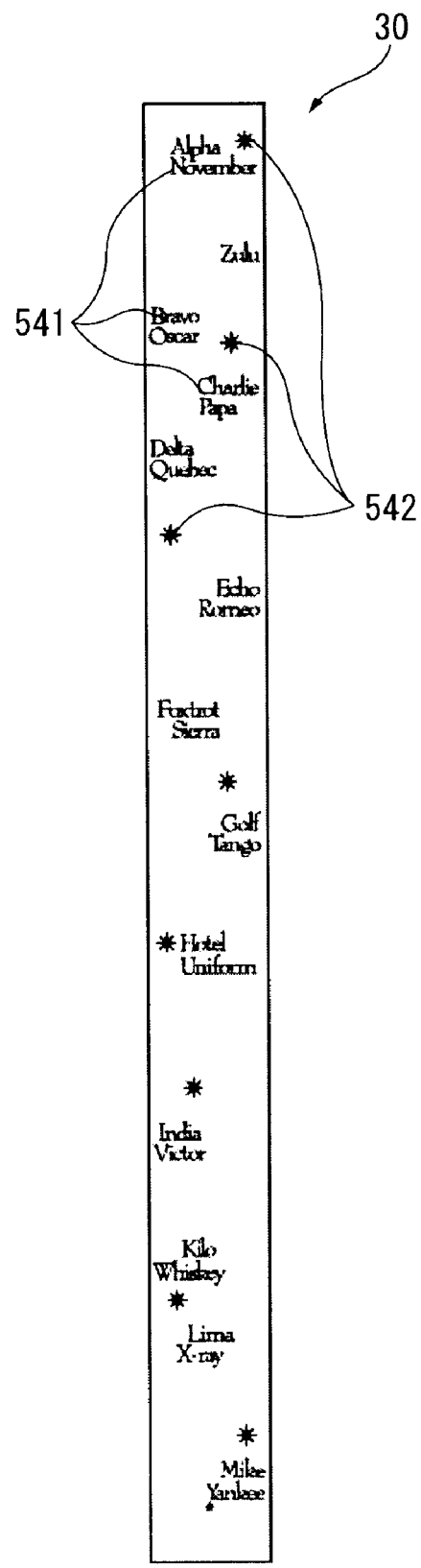
FIG. 9B shows an example of displaying a time code on the display panel in a preferred embodiment of the invention.

FIG. 9B shows the time code indicators 541 for indicating the time code in a world time function using phonetic codes, and daylight savings time indicators 542 that are star-shaped symbols used to indicate when daylight savings time is in effect.

8. Displaying the Time

Figure 10:
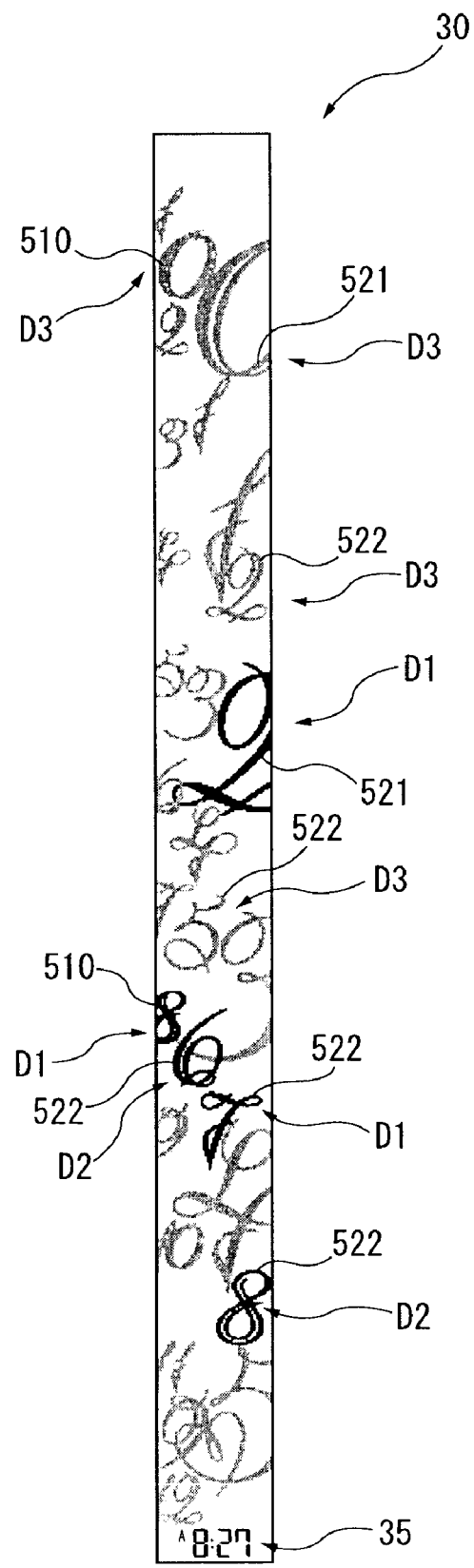
FIG. 10 shows an example of the time display on the display panel in a preferred embodiment of the invention.

FIG. 10 shows the normal operating mode of the electronic timepiece 1. The current time is displayed on the display panel 30 in this normal operating mode.

The current time displayed in FIG. 10 is 8:27, and the hour display segment 510 for the "8," the tens-digit display segment 521 for the "case 2," and the ones-digit display segment 522 for the "7" are driven to display black as a first display state. This first display state is labelled D1 in FIG. 10.

Note that the current time is also displayed in the seven-segment display unit 35 in the normal operating mode in this embodiment of the invention.

Of the plural ones-digit display segments 522, this embodiment of the invention displays the ones-digit display segment 522 corresponding to the "7" for the minute of the current time black in the first display state D1, and displays ones-digit display segments 522 for the "6" and "8" dark gray in the second display state as the values chronologically before and after the minute of the current time. This second display state is denoted D2 in FIG. 10.

The hour display segments 510, tens-digit display segments 521, and ones-digit display segments 522 other than those that are displayed black or dark gray are displayed light gray as a third display state in this embodiment of the invention. This third display state is denoted D3 in FIG. 10.

The areas of the segment electrodes 310 that are not driven to display in the first display state D1 (black), the second display state D2 (dark gray), or the third display state D3 (light gray), and the area of the background display electrode (not shown in the figure), are driven to display white, thus rendering the background display of the display panel 30.

The information that is selectively displayed black as the current time information in the hour display segments 510, the tens-digit display segments 521, and the ones-digit display segments 522 is sequentially selected as time passes, and the segments that are driven to display the before and after values dark gray are also changed accordingly. More specifically, because the position where the time is displayed moves to a different part of the display panel 30 as time passes, this change of time can be used for the enjoyment of the user of the timepiece 1.

9. Display Modes

The electronic timepiece 1 also has a plurality of display modes that can be selected using an operating button 43. For example, the display mode can be changed to reverse the black and white portions of the display panel 30.

In order to invert the display, the drive circuit unit 40 reverses the polarity of the potential applied to the common electrode 320 and the potential applied to the segment electrodes 310.

When the display is reversed from the display state shown in FIG. 10, the first display state that is black in FIG. 10 goes to white and the background changes from white to black. In addition, the second display state, which is dark gray above, goes to light gray, and the third display state changes from light gray to dark gray.

In the animation mode that executes every hour, for example, the crack indicators 531 are displayed and then in the area between the crack indicators 531 the numerals or letters of the segment electrodes 310 are driven to turn on and off so that the symbols appear to move from one lengthwise end to the other end of the display panel 30.

Other operating modes include a time adjustment mode and a flash mode that causes the display panel 30 to flash black and white when the power turns on.

10. Segment Conductivity

Conductivity of the segment electrodes 310 in this embodiment of the invention is described next.

The numbers and other symbols displayed on the display panel 30 in this embodiment of the invention are arranged so that two or more or three or more different symbols overlap. This is accomplished by separating the segment electrode 310 for each numeral or letter into the overlapping part and the non-overlapping part, and wiring the overlapping part and the non-overlapping part through separate vias 314 (FIG. 5).

Some numerals overlap with another numeral in more than one place in this display panel 30, but these plural overlapping parts are parts that are displayed in the same display state at the same time as one or another particular symbol. As a result, the parts of the segment electrodes 310 associated with the plural overlapping areas may pass through separate vias 314 but are connected to a common wire 312 on the back side of the display substrate 31, and are connected to the same node of the display drive circuit 426 by means of the wire 312 and wiring member 412.

Note that this wiring can be done by applying an appropriate flexible wiring board to the back side of the display substrate 31 (the side opposite the transparent substrate 32).

Depending on how the numerals overlap, any numeral or symbol may have plural non-overlapping parts where the symbol does not overlap another symbol. Because these non-overlapping parts are also displayed at the same time in the same display state, the non-overlapping parts are also connected to the same node of the display drive circuit 426 by means of common wiring 312 (FIG. 5).

In other words, electrodes that are driven to simultaneously display the same display state are connected to a common node so that the total number of wiring nodes required by the display panel 30 does not exceed the number of output pins of the display drive circuit 426.

11. Effect of the Embodiment

This embodiment of the invention affords the following effects.

(1) Time is displayed on the display panel 30 of the electronic timepiece 1 by displaying prescribed information identified from the current time in a first display state (black), and before and after information that is information chronologically before and after the prescribed information (the ones digit of the minute in this embodiment of the invention) in a second display state (dark gray). Because the display state of the before and after information makes the before and after information easy to distinguish from the prescribed information, the prescribed information can be estimated by reading the before or after information, and the time can be easily determined. A ring-shaped electronic timepiece 1 that is easy to read and easy to use can thus be achieved.

(2) The design and appearance can also be greatly improved because the numerals or symbols of the hour display segments 510, tens-digit display segments 521, and ones-digit display segments 522 are arranged in a disperse layout throughout the display area of the display panel 30, that is, because the entire display area of the display panel 30 can be used effectively to display information.

More specifically, readability and an artistic design can be balanced, and a timepiece 1 can be provided as a decorative article with a display function.

(3) In addition to the prescribed information denoting the current time and information before and after the current time, other information can additionally be displayed in a third display state (light gray), thus increasing the number of design elements and enabling the entire display panel 30 to be used decoratively. In other words, the design and appearance can be improved because the entire display panel 30 becomes a single decorative display.

The readability of the time displayed by the first and second display states can also be balanced with an artistic design because the contrast between the third display state (light gray) of the other information and the display state (white) of the background display is less than the contrast between the background (white) and the first (black) and second (dark gray) display states.

(4) Furthermore, because the display panel 30 is an electrophoretic display, a high resolution display is possible and the first display state and second display state can be easily recognized, and the readability of the time information can be further improved.

Power consumption is also reduced because electrophoretic displays feature high image display retention.

(5) Because the contrast between black and white is high on the display panel 30, the first, second, and third display states and the background can be expressed the four gradations of black, dark gray, light gray, and white, respectively, and clearly distinguished by the contrast between the gradations.

(6) Using a flexible display panel 30 affords an annular timepiece 1 that has a display panel 30 disposed 360 degrees around the circumference, and decorativeness can be imparted to the entire display panel 30 by disposing the display panel 30 in a ring.

(7) When the timepiece 1 is rendered with a substantially annular case 2 the position of the front of the display is not necessarily defined, and the numerals, letters, and other symbols can be freely arranged on the display panel 30. However, because information is displayed using differences in contrast, the displayed information can be easily found even when the display panel 30 is large and wrapped in a circle. The current time is also easily read even if the case 2 rotates around the wrist.

(8) Time information is displayed on the display panel 30 of the timepiece 1 using different font sizes for the numerals formed by the hour display segments 510, the numerals formed by the tens-digit display segments 521, and the numerals formed by the ones-digit display segments 522, and the hour, the ten-minute digit, and the one-minute digit (style) can be easily distinguished from the font size of the numbers. A ring-shaped timepiece 1 that is easy to read and easy to use can thus be achieved.

(9) The hour display segments 510, the tens-digit display segments 521, and the ones-digit display segments 522 are displayed as a sequence of numbers in a time series, and the same numbers are displayed in different styles at plural positions on the display panel 30. Differentiating the hour, the tens digit, and the ones digit is not difficult, however, and whether a displayed number is the hour, the tens digit, or the ones digit can be easily determined based on the size of the numbers in the hour display segments 510, the tens-digit display segments 521, and the ones-digit display segments 522.

(10) By locating the hour display segments 510 and the tens-digit display segments 521 so that a part of the displayed numerals extends outside the display area of the display panel 30 while assuring that the numbers can be easily read, space efficiency is improved in the display area of the display panel 30, and different information can be efficiently arranged in the display area of the display panel 30.

Furthermore, the font size can be increased such as in the tens-digit display segments 521, and the readability of the display can be improved.

In addition, the type of information displayed by the hour display segments 510 and the tens-digit display segments 521 can be determined based on the extension of the numbers outside the display area.

(11) Furthermore, because the hour, the tens digit, and the ones digit are displayed using different font sizes and at different positions on the display panel 30 by the hour display segments 510, the tens-digit display segments 521, and the ones-digit display segments 522, the hour, the tens digit, and the ones digit can be easily differentiated based on the different display positions. The readability of the time information on the timepiece 1 is thus further improved.

(12) Furthermore, because the hour display segments 510 and the tens-digit display segments 521 are disposed at regular intervals along the length of the display panel 30, the hour display segments 510 and the tens-digit display segments 521 are easy to read. Identifying the hour display segments 510, the tens-digit display segments 521, and the ones-digit display segments 522 is thus made even easier based on their display positions.

Embodiment 2

A timepiece according to a second embodiment of the invention is described next. The timepiece according to this embodiment has a display panel disposed around the outside of an annular case in the same way as the timepiece 1 of the first embodiment, and is identical to the timepiece of the first embodiment except for the content displayed on the display panel.

Figure 11:
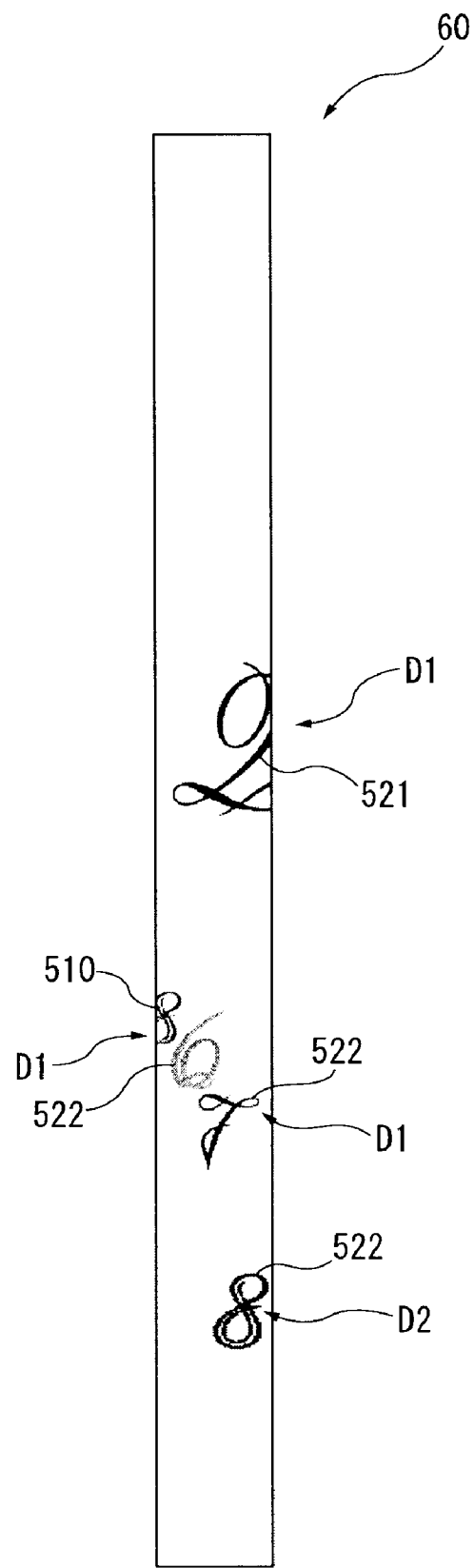
FIG. 11 shows an example of the time display on the display panel in a second embodiment of the invention.

FIG. 11 is a plan view showing the display panel 60 of the timepiece according to this embodiment of the invention. Other information that is neither the prescribed information identified from the current time nor the before and after information is displayed in a third display state (D3 in FIG. 10) in the foregoing first embodiment. In this embodiment, however, this other information is displayed white as part of the background display.

In FIG. 11 the current time is 8:27 and the hour display segment 510 and the tens-digit display segment 521 display in the same way as in the first embodiment.

The ones-digit display segments 522, however, are driven to display the "7" of the prescribed information in the first display state (black), display the value (6) before the prescribed information in chronological order using light gray, and display the value (8) after the prescribed information in chronological order using dark gray (equivalent to the second display state). In other words, the display state of the before value (6) and the display state of the after value (8) are different.

In addition to affording the same effects of the first embodiment described in (1), (2), and (4) to (7) above, this embodiment of the invention also affords the following effect.

(8) Whether the before and after information is the value (6) before or the value (8) after the prescribed information (7) can be immediately determined based on the difference in the display states (light gray and dark gray) of the before and after information, and ease of use is thus improved.

Embodiment 3

A timepiece according to a third embodiment of the invention is described next. The timepiece according to this embodiment has a display panel disposed around the outside of an annular case in the same way as the timepiece 1 of the first and second embodiments, and is identical to the timepiece of the first and second embodiments except for the content displayed on the display panel.

Figure 12:
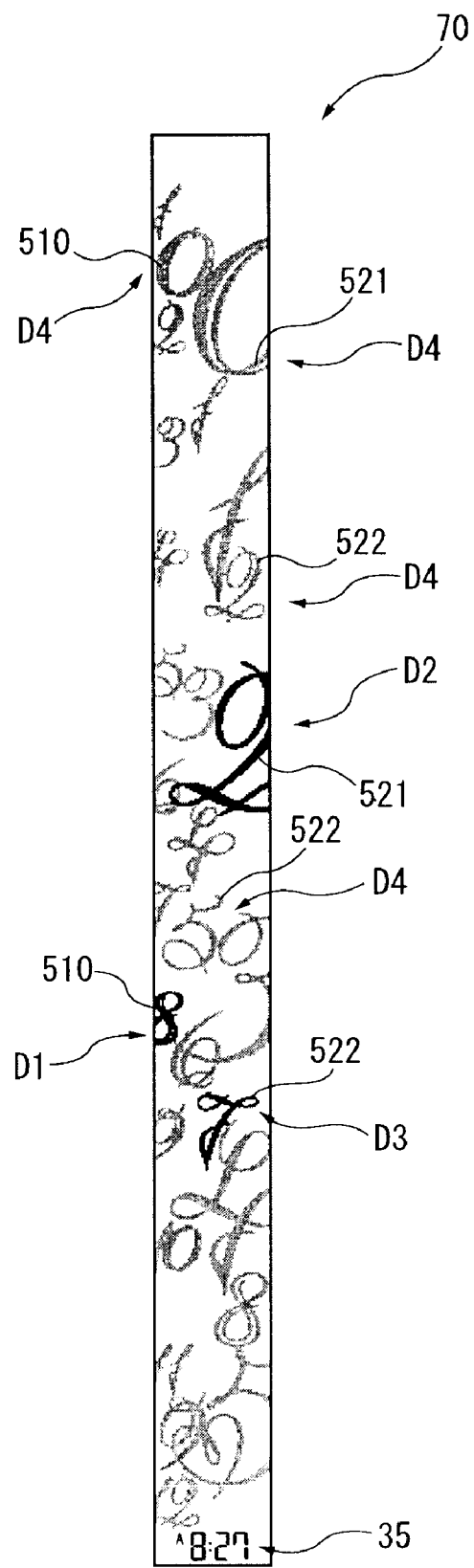
FIG. 12 shows an example of the time display on the display panel in a third embodiment of the invention.

FIG. 12 is a plan view of the display panel 70 of the timepiece in this embodiment of the invention. In this embodiment of the invention the hour display segment 510 is displayed in the first display state (black), the tens-digit display segment 521 is displayed in the second display state (dark gray), the ones-digit display segment 522 is displayed in the third display state (medium gray), and the background is displayed light gray. In FIG. 12 the first display state is denoted D1, the second display state is denoted D2, the third display state is denoted D3, and the background display is D4.

By thus distributing the hour, minute, and other information displays throughout the display area of the display panel 70 and varying the display state (D1 to D3) according to the type of information, the information can be easily identified based on the display state.

This embodiment of the invention affords the same benefits as the embodiments described above, and can thus greatly improve the readability of the timepiece as well as the appearance and design.

Embodiment 4

A timepiece according to a fourth embodiment of the invention is described next with reference to FIG. 13.

Figure 13:
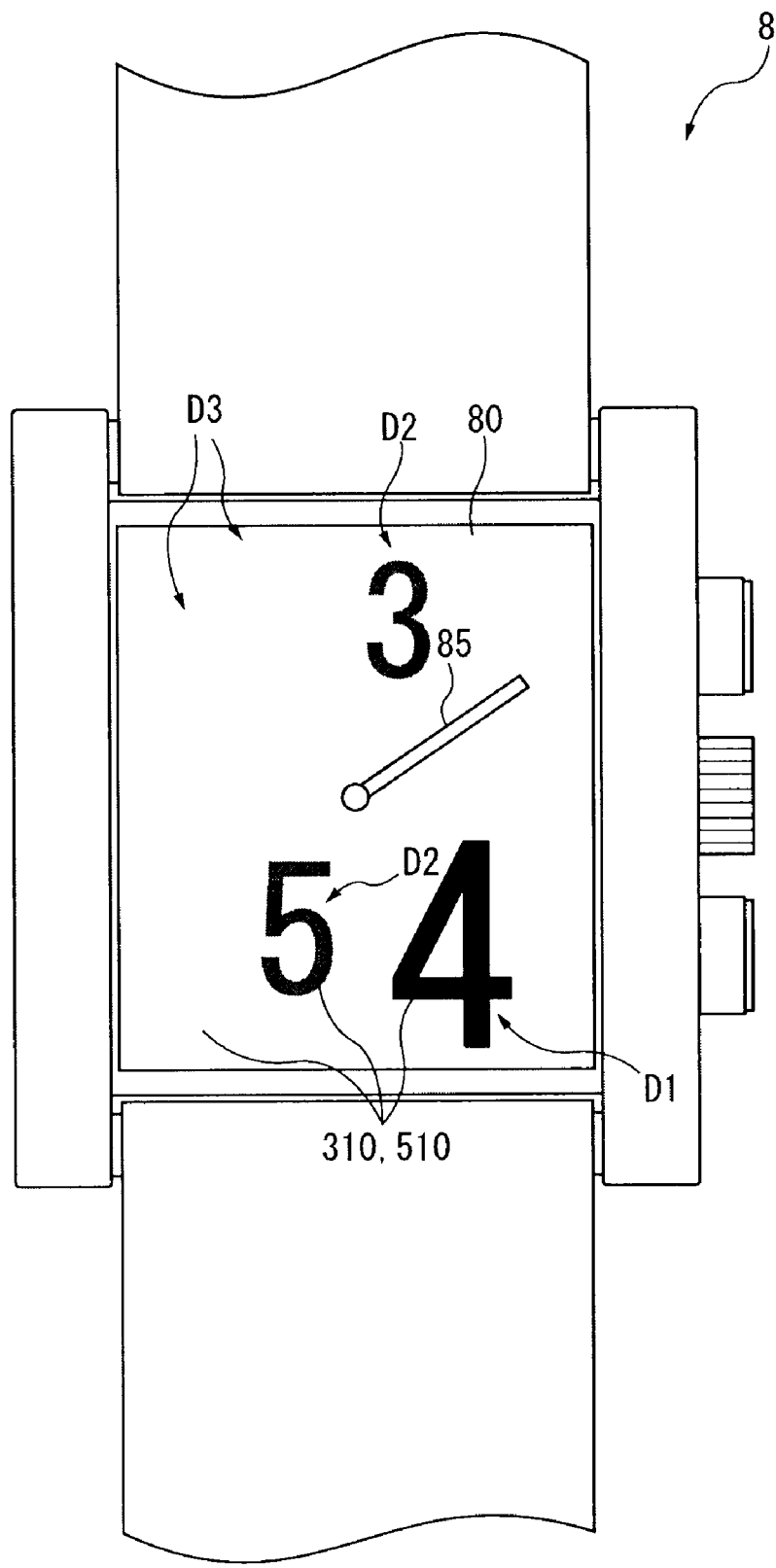
FIG. 13 shows a timepiece according to a fourth embodiment of the invention.

FIG. 13 is a plan view showing the appearance of a timepiece 8 according to this embodiment of the invention. Unlike the timepieces described in the foregoing embodiments of the invention, this timepiece 8 has an electrophoretic display panel 80 that is flat and substantially rectangularly shaped instead of ring shaped.

A minute hand 85 that is driven by a drive wheel train on the back side of the display panel 80 is disposed substantially in the center of the display panel 80, and the timepiece 8 displays the minute using an analog minute hand 85.

The display panel 80 also has a plurality of segment electrodes 310 rendered in the shape of the numbers "1" to "12" distributed over substantially the entire display area of the display panel 80. These segment electrodes 310 are driven in the same way as the ones digit in the first embodiment to indicate the hour (hour display segment 510).

More specifically, the "hour" that is the prescribed information identified from the current time is "4" in the example shown in FIG. 13 and this "4" is displayed in the first display state D1 (black). The numbers "3" and "5" that are the before and after information of the hour "4" are displayed in the second display state D2 (dark gray), and the other numbers are displayed in the third display state D3 (light gray).

This embodiment of the invention affords the same benefits described as effects (1) to (5) of the first embodiment.

Embodiment 5

A timepiece according to a fifth embodiment of the invention is described next with reference to FIG. 14.

Figure 14:
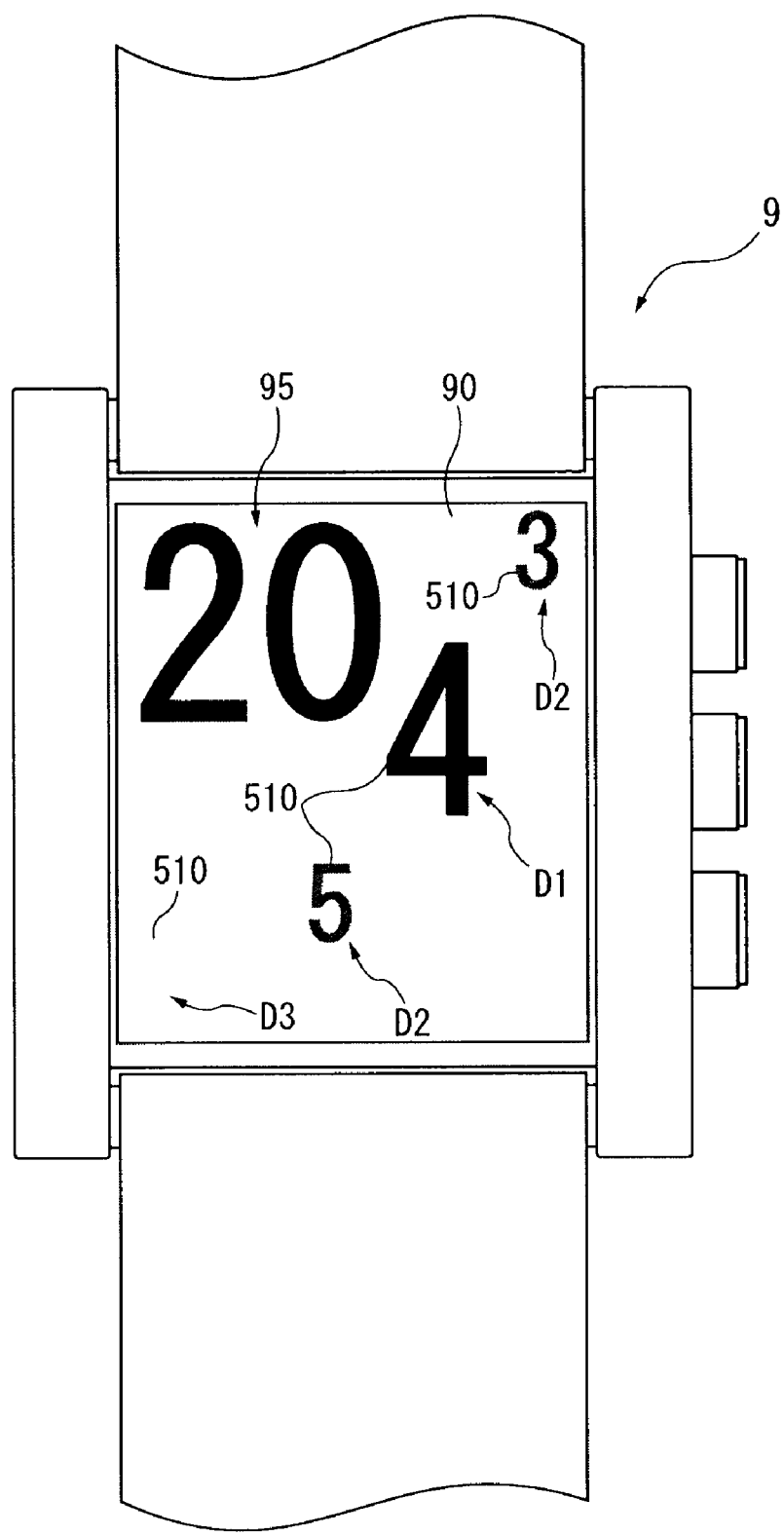
FIG. 14 shows a timepiece according to a fifth embodiment of the invention.

FIG. 14 is a plan view showing the appearance of a timepiece 9 according to this embodiment of the invention. Like the timepiece 8 in the fourth embodiment, this timepiece 9 also has a flat electrophoretic display panel 90. Unlike the segment drive display panels of the foregoing embodiments, this display panel 90 is an (active) dot matrix drive display having a transistor for each pixel (dot) of the display image.

The display panel 90 in this embodiment of the invention can display a diverse range of images and can operate in different display modes by switching the black/white display state of each dot. In the display mode shown in FIG. 14 the display panel 90 has a minute display unit 95 that is updated every minute in the upper left part of the display area. The hour is displayed using the same method described in the first embodiment and the fourth embodiment using a plurality of numbers (hour display segments 510) disposed at different positions on the display panel 90. In FIG. 14 multiple numbers are displayed including the current hour of "4" and the "3" and "5" of the hours before and after the current hour.

The dot matrix drive method used in this embodiment of the invention can also be used to display multiple gradations as in the first to third embodiments by controlling the area ratio of black and white in the group of dots that display black and the dots that display white.

This embodiment of the invention affords the same benefits described as effects (1) to (5) of the first embodiment.

Other variations of the Invention

Some preferred embodiments of the invention are described above, but the invention is not limited to these embodiments and can be improved and varied in many ways without departing from the scope of the invention.

In the first and second embodiments the prescribed information is displayed in the first display state and information before and after the prescribed information is displayed in a state that differs from the first display state only in the ones-digit display segments 522, but the invention is not so limited. More specifically, the tens-digit display segments 521 or the hour display segments 510 can be driven to display the prescribed information and the before and after information in different display states.

If the month or day are displayed on the display panel, the month or day can also be displayed using different display states for the prescribed information and the before and after information.

The foregoing embodiments use a different font size for the hour display segments 510, the tens-digit display segments 521, and the ones-digit display segments 522 and arrange the hour display segments 510, the tens-digit display segments 521, and the ones-digit display segments 522 at different regular positions on the display panel 30. However, the hour display segments 510, the tens-digit display segments 521, and the ones-digit display segments 522 can be arranged at random display positions instead of regularly ordered positions, and the hour, tens digit, and ones digit can be differentiated based on differences in font size alone.

Further alternatively, the hour display segments 510, the tens-digit display segments 521, and the ones-digit display segments 522 can be displayed using the same font size while displaying the hour display segments 510, the tens-digit display segments 521, and the ones-digit display segments 522 at different positions on the display panel 30 according to the type of information so that the hour, tens digit and ones digit are identified based on differences in position alone. In this case the display positions of the hour display segments 510, the tens-digit display segments 521, and the ones-digit display segments 522 can be regular or random.

When the hour display segments 510, the tens-digit display segments 521, and the ones-digit display segments 522 are disposed to fixed display positions according to the information type, the positions are not limited to a specific direction along the display panel 30 as described above. More particularly, the display area of the display panel 30 can be segmented into plural parts such as by dividing the display areas of the hour, the tens digit, and the ones digit across the width of the display panel 30, or quartering the display panel 30 by dividing the display area in half lengthwise and widthwise, and the hour, ones digit, tens digit, and other information can be displayed in the different display areas.

The plural types of information displayed on the display panel 30 are not limited to the hour display segments 510, the tens-digit display segments 521, and the ones-digit display segments 522 as described above, and the information can include the month or day, for example. The month, day, or other information can also be identified by using a different font size or display position, for example, according to the type of information.

A segment drive display method is used in the first to fourth embodiments above, but a dot matrix drive method can be used instead. Unlike a segment drive method in which the displayed shape is determined by the shape of the segment electrode 310, a dot matrix drive method enables changing the orientation, size, and arrangement of the numbers indicating the time according to the display mode. More specifically, the orientation of the display can be varied so that the top and bottom of the display are at opposite ends of the long axis of the display panel 30 as shown in FIG. 10, or the top and bottom of the display are at opposite ends of the short (widthwise) axis of the display panel 30, or so that the top and bottom of the display are at opposite ends of a diagonal to the long axis of the display panel 30. A dot matrix drive method thus affords a greater number of display modes and a more varied display.

The display panel 30 in the foregoing embodiments has one number for each unique time value in the hour display segments, tens-digit display segments, and ones-digit display segments, but the invention is not so limited. More particularly, numbers indicating the same time value can be disposed to plural different positions on the display panel. For example, the number "1" for denoting the hour "1" can be disposed at plural positions on the display. The orientation, size, and font of the individual numbers, and which numbers are displayed simultaneously, can also be arranged as desired.

More specifically, because the prescribed information and the before and after information are displayed at plural locations on the display panel, the information can be read from different directions to the display panel, and readability can thus be improved.

The electrophoretic display is described above as a two-particle electrophoretic display using black particles 331A and white particles 331B above, but the invention is not so limited. More particularly, a single particle electrophoretic display using blue/white particles, for example, can be used, or a combination other than black and white can be used.

The hour display segments 510, the tens-digit display segments 521, and the ones-digit display segments 522 are arranged at regular intervals along the length of the display panel 30 in the embodiments described above, but the hour display segments 510, the tens-digit display segments 521, and the ones-digit display segments 522 are not limited to this arrangement and they can be randomly arranged.

The display device of the present invention can be widely used in electronic timepieces having a timepiece function, including in PDA (personal digital assistant) devices, cell phones, memory cards, digital cameras, video cameras, printers, and personal computers.

The invention can be used in a display device that displays information other than time information, including devices that sequentially display information that has a regular order or information of plural different types. More specifically, the invention can also be used in display devices that do not have a timekeeping function.

The best modes and methods of achieving the present invention are described above, but the invention is not limited to these embodiments. More specifically, the invention is particularly shown in the figures and described herein with reference to specific embodiments, but it will be obvious to one with ordinary skill in the related art that the shape, material, number, and other detailed aspects of these arrangements can be varied in many ways without departing from the technical concept or the scope of the object of this invention.

Therefore, description of specific shapes, materials and other aspects of the foregoing embodiments are used by way of example only to facilitate understanding the present invention and in no way limit the scope of this invention, and descriptions using names of parts removing part or all of the limitations relating to the form, material, or other aspects of these embodiments are also included in the scope of this invention.

What is claimed is:

1. A display device comprising:
a timekeeping unit that keeps time; and
a display unit that displays numerals denoting the hour value of time information, numerals denoting the tens digit of the minute value of the time information, and numerals denoting the ones digit of the minute value of the time information at dispersed over the display area of the display device, and varies the position where time information is displayed by the numeral denoting the hour value, the numeral denoting the tens digit of the minute value, and the numeral denoting the ones digit of the minute value, based on time information kept by the timekeeping unit;
wherein the numeral denoting the hour value, the numeral denoting the tens digit, and the numeral denoting the ones digit are displayed on the display unit according to at least one of a specified display state and a specified display position;
wherein the numerals denoting the hour value, the numerals denoting the tens digit, and the numerals denoting the ones digit are displayed in a font size prescribed for the hour value, the tens digit, and the ones digit, respectively, the font size for the numerals denoting the hour value, tens digit, and ones digit each being different from one another; and
the numerals denoting the hour value, the numerals denoting the tens digit, or the numerals denoting the ones digit are disposed so that a part of the numerals extends outside the display area of the display unit and the numerals can be partially read.

2. The display device described in claim 1, wherein:
prescribed information sequentially determined based on the time information is displayed in a first display state as the display state of the numerals denoting the hour value, the numerals denoting the tens digit, or the numerals denoting the ones digit; and
at least one of a before value and an after value, which are the values chronologically before and after the prescribed information, is displayed in the numerals denoting the hour value, the numerals denoting the tens digit, or the numerals denoting the ones digit in a second display state, which is a display state that is different from the first display state.

3. The display device described in claim 1, wherein:
information that is not the prescribed information, the before value, or the after value is displayed in the numerals denoting the hour value, the numerals denoting the tens digit, and the numerals denoting the ones digit in a third display state, which is a display state different from the first and second display states.

4. The display device described in claim 1, wherein:
the difference between the first display state and the second display state is a difference in the contrast of the display colors presented on the display unit or a difference in the hue of the display colors presented on the display unit.

5. The display device described in claim 1, wherein:
the other of the before value and the after value is displayed in a display state other than the first display state and the second display state.

6. The display device described in claim 1, wherein:
the numerals denoting the hour value, the numerals denoting the tens digit, and the numerals denoting the ones digit are displayed in display states prescribed for the hour value, the tens digit, and the ones digit, respectively.

7. The display device described in claim 1, wherein:
the numerals denoting the hour value, the numerals denoting the tens digit, and the numerals denoting the ones digit are displayed in a display position prescribed for the hour value, the tens digit, and the ones digit, respectively.

8. The display device described in claim 7, wherein:
the numerals denoting the hour value, the numerals denoting the tens digit, and the numerals denoting the ones digit are disposed so that the hour value, the tens digit, and the ones digit are disposed regularly substantially along a prescribed axis of the display unit.

9. The display device described in claim 1, wherein:
the display unit is an electrophoretic display device.

10. The display device described in claim 1, further comprising:
an annular case;
wherein the display unit is disposed to the case curving around the circumference of the case.

11. The display device described in claim 10, wherein:
indications denoting chronologically identical information are disposed to the display unit at different locations.

12. A display method for displaying numerals denoting the hour value of time information, numerals denoting the tens digit of the minute value of the time information, and numerals denoting the ones digit of the minute value of the time information, comprising steps of:
displaying the numerals denoting the hour value, the numerals denoting the tens digit, and the numerals denoting the ones digit at positions dispersed over the display area of a display device;
varying the position where the time information is displayed by the numeral denoting the hour value, the numeral denoting the tens digit of the minute value, and the numeral denoting the ones digit of the minute value; and
displaying the numeral denoting the hour value, the numeral denoting the tens digit, and the numeral denoting the ones digit according to at least one of a specified display state and a specified display position;
displaying the numerals denoting the hour value, the numerals denoting the tens digit, and the numerals denoting the ones digit in a font size prescribed for the hour value, the tens digit, and the ones digit, respectively, the font size for the numerals denoting the hour value, tens digit, and ones digit each being different from one another; and disposing the numerals denoting the hour value, the numerals denoting the tens digit, or the numerals denoting the ones digit so that a part of the numerals extends outside the display area of the display unit and the numerals can be partially read.

13. The display method described in claim 12, wherein:

prescribed information sequentially determined based on the time information is displayed in a first display state as the display state of the numerals denoting the hour value, the numerals denoting the tens digit, or the numerals denoting the ones digit; and at least one of a before value and an after value, which are the values chronologically before and after the prescribed information, is displayed in the numerals denoting the hour value, the numerals denoting the tens digit, or the numerals denoting the ones digit in a second display state, which is a display state that is different from the first display state.

14. The display method described in claim 12, wherein:

the numerals denoting the hour value, the numerals denoting the tens digit, and the numerals denoting the ones digit are displayed in display states prescribed for the hour value, the tens digit, and the ones digit, respectively.

15. The display method described in claim 12, wherein:

the numerals denoting the hour value, the numerals denoting the tens digit, and the numerals denoting the ones digit are displayed in a display position prescribed for the hour value, the tens digit, and the ones digit, respectively.

* * * * *